Patented Mar. 19, 1935

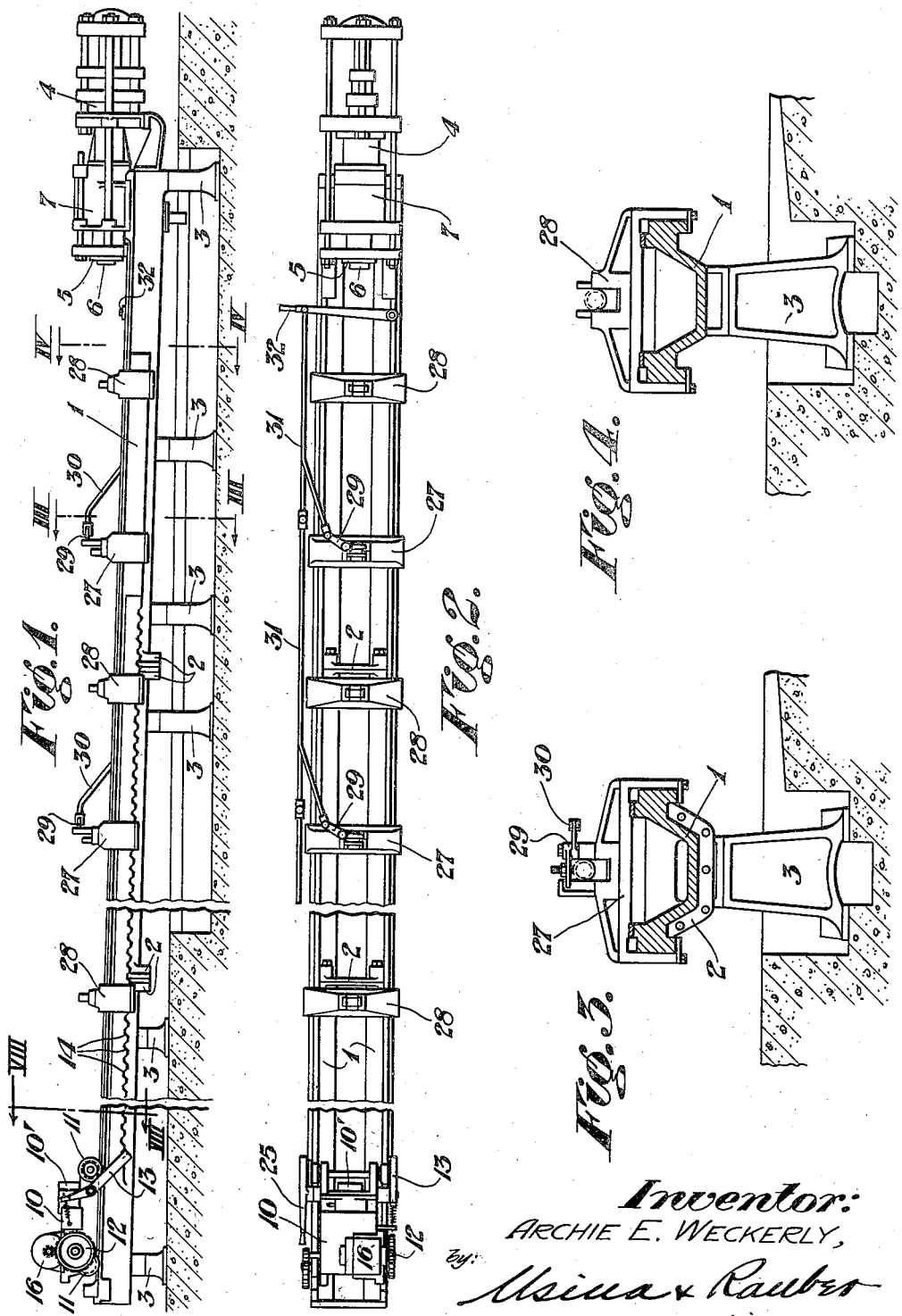

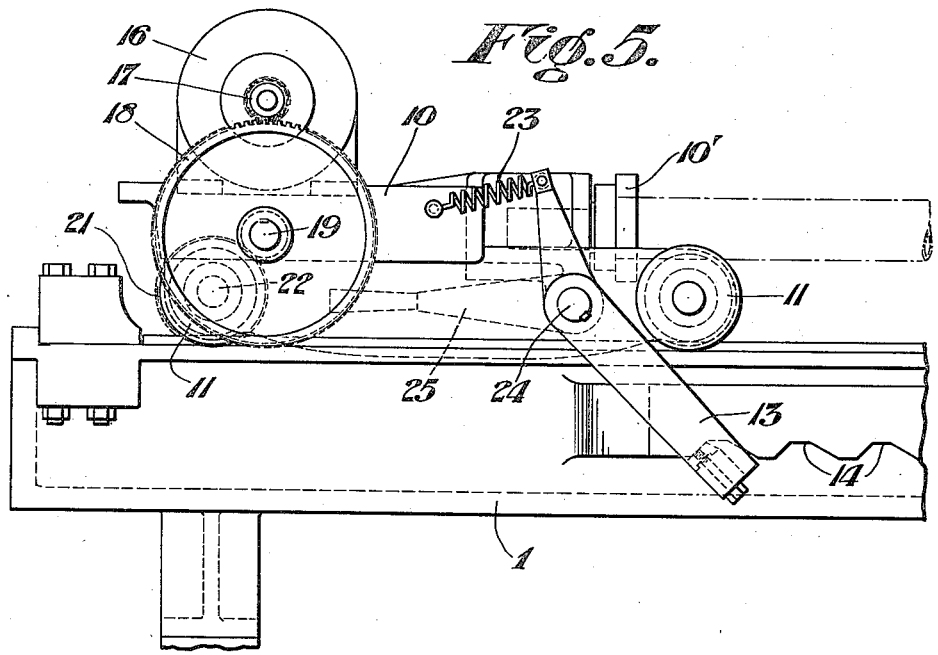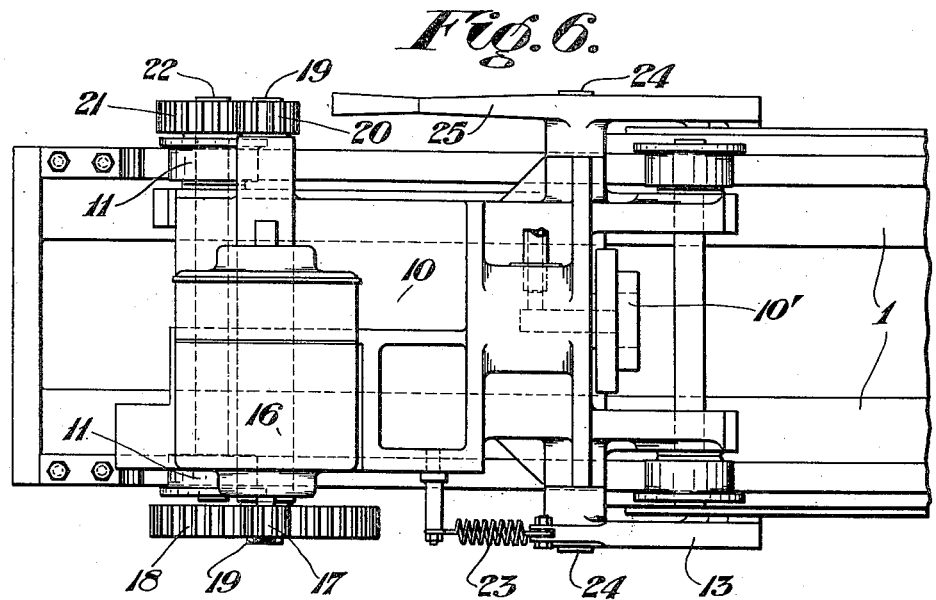

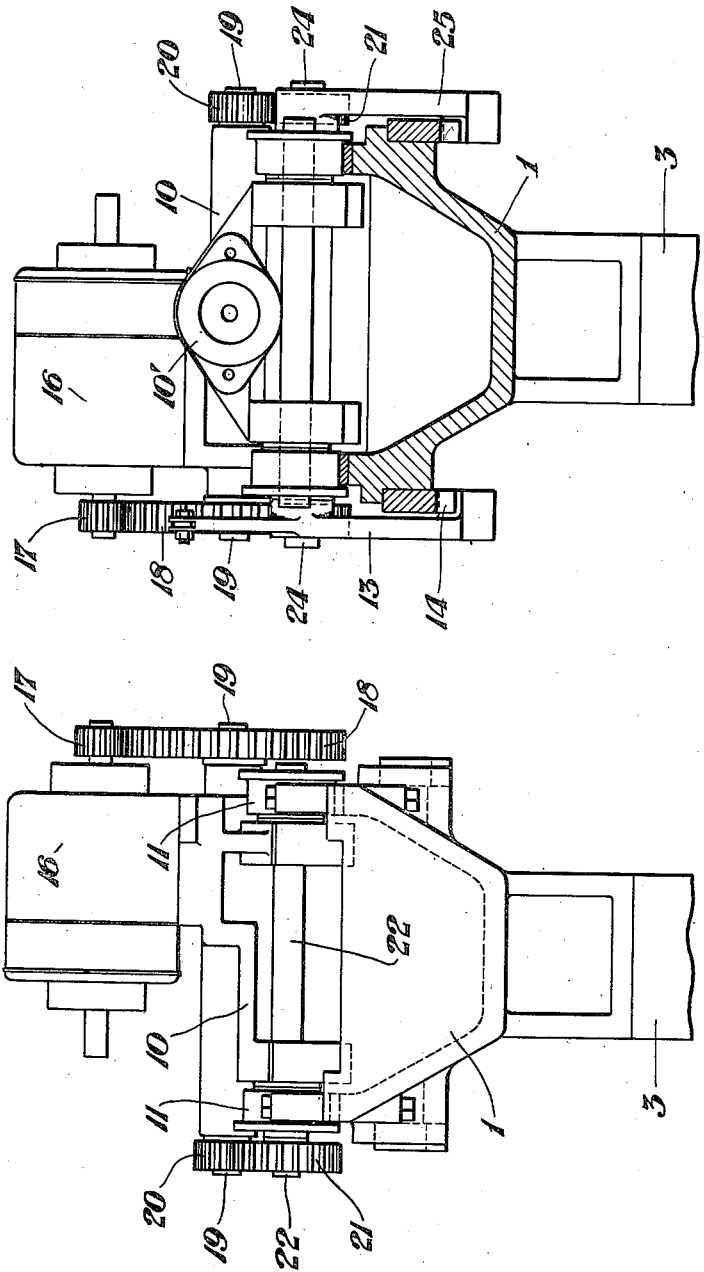

1,994,675

UNITED STATES PATENT OFFICE 1,994,675

PIPE TESTING MECHANISM

Archie E. Weckerly, Pittsburgh, Pa., assignor to National Tube Company, a corporation of New Jersey Application November 4, 1930, Serial No. 493,425

2 Claims. (Cl. 73—51)

This invention relates to improvements in pipe testing machines of the type employing hydrostatic pressure and it is among the objects thereof to provide a machine which shall be of simple and rigid mechanical construction, which shall be especially adapted to facilitate the handling of pipe in mounting it for test and removing it from the machine, and which shall be adapted for rapid adjustment of the pipe holding means for pipe of different lengths.

In the testing of pipe it is necessary to fill the pipe with water and subject it to a predetermined pressure to determine whether there are leaks and where such leaks are located.

A machine for this purpose is illustrated in the accompanying drawings constituting a part hereof and in which like reference characters designate like parts.

In the drawings:

Figure 1 is a side elevational view of a pipe testing machine embodying the principles of this invention.

Figure 2 is a top plan view thereof.

Figure 3 is a cross-sectional view of one of a number of pipe supports mounted on the bed, taken along the line III—III of Figure 1.

Figure 4 is a cross-sectional view of another form of pipe support taken along the line IV—IV of Figure 1.

Figure 5 is a side elevational view of a movable carriage mounted on one end of the machine shown in Figure 1.

Figure 6 is a top plan view of the carriage of Figure 5.

Figure 7 is a rear elevational view of the carriage.

Figure 8 is a cross-sectional view thereof taken along the line VIII—VIII of Figure 1.

With reference to Figures 1 to 4 of the drawings, the structure therein illustrated comprises a bed generally designated at 1 which is constructed of a plurality of castings joined at their ends 2 and which are supported on standards 3.

A test head, generally designated at 4, is mounted on one end of the machine and is provided with a face plate 5 having an extension 6 forming a pilot for the end of the pipe which is placed to abut face 5 of the head. The pipe engaging face 5 is axially movable through a fluid pressure device generally designated at 7 to cause pressure to bear against the end of the pipe when it is mounted in the machine. A movable carriage 10 is mounted at the other end of the machine and is movably supported thereon by flanged wheels 11 which are motor driven through suitable gearing 12. The carriage is provided with a pipe engaging face 10' and an arm 13 which is adapted to engage a series of notches 14 provided on the under side of the casting 1, the arm functioning to hold the carriage against displacement after it has been moved to its proper position for a particular length of pipe to be tested. The details of the carriage are more clearly shown in Figs. 5 to 8 of the drawings in which a motor 16 is shown with a pinion 17 driving a gear wheel 18 that actuates a shaft 19 on the other end of which is mounted a gear wheel 20 that intermeshes with a wheel 21 of a shaft 22 on which the traction wheels 11 are mounted. By operating the motor the carriage travels back and forth on the machine bed.

The arm 13 is normally biased by a coil spring 23 to yieldingly urge it against the notches 14 and the arm 15 is movable through a shaft 24, one end of which is provided with a hand operating lever 25 that is manipulated to release the arm from the notches 14 when it is desired to move the carriage.

With reference to Figs. 1 to 4 of the drawings, a plurality of supports 27 and 28 are mounted intermediate the test head and carriage to constitute supports for the pipe and to prevent buckling of pipe of great length. The supports 27 are provided with a swinging lever 29 as shown in Fig. 3 of the drawings, this lever being connected through an arm 30 with a link 31 extending to the head end of the machine and which is operative through a hand lever 32 by means of which all of the support levers 29 are simultaneously operated. The supports 28 shown in cross section in Fig. 4 are left open.

The operation of the device hereinbefore described is briefly as follows: The pipe to be tested is lowered on the supports 27 and 28, the supports 27 having their retaining levers 29 in the open position and the operator by shifting the lever 32 closes the levers 29. The carriage 10, which has a limited travel between the end of the mechanical bed and the rearmost support 28, is then advanced to bring its pipe engaging face 10' in engagement with the end of the pipe to push the latter against the face plate 5 of the test head.

Carriage 10 is locked in position by the arm 13 through engagement of the latter with the notches 14 and the fluid pressure device 7 is connected to a source of pressure to effect intimate engagement of the end plate 5 with the end of the pipe.

The pipe is filled with water and when nearly filled hydraulic pressure is applied to determine whether there are any weak sections or leaks, after which the pressure is removed and the pipe is released from its end abutments and lifted out of the machine, after the operator swings lever 32 to move levers 29 to their open positions.

It is evident from the foregoing description of this invention that pipe testing machines made in accordance therewith are of simple construction and facilitate the handling of piping for testing purposes.

By employing a machine bed made up of sections of very substantial castings and by utilizing the retaining supports, the long reinforcing rods heretofore employed are eliminated, and by utilizing a movable carriage which is locked in position as hereinbefore described, the pipe can be mounted in a minimum of time.

Although one of the embodiments of the invention has been herein illustrated and described, it will be obvious to those skilled in the art that various modifications may be made in the details of construction without departing from the principles herein set forth.

I claim:

1. A pipe testing machine comprising an elongated bed structure, a test head mounted at one end of said bed structure, a wheeled carriage at the other end of said bed and adapted to have a limited travel lengthwise of said bed toward and away from said test head, and a plurality of vertical pipe supports intermediate said test head and said carriage, a motor mounted on said carriage and having a driving connection with at least one of the wheels thereof, a pipe-engaging face on said carriage forming an abutment for one end of the pipe to be tested, locking means on said bed, an arm pivoted to said carriage and adapted to engage the locking means on said bed, means for normally urging said arm into engagement with the locking means on said bed, a lever on said carriage for opposing said last named means, a movable abutment on said test head adapted to engage the other end of the pipe to be tested, and fluid pressure means for moving said last named abutment against the end of the pipe.

2. A pipe testing machine comprising an elongated bed structure, a test head mounted at one end of said bed structure, a wheeled carriage at the other end of said bed and adapted to have a limited travel lengthwise of said bed toward and away from said test head, and a plurality of vertical pipe supports intermediate said test head and said carriage, a motor mounted on said carriage, a gear train connecting said motor and at least one of the wheels of said carriage, a pipe engaging face on said carriage forming an abutment for one end of the pipe to be tested, a rack on the under side of said bed, an arm pivoted to said carriage and adapted to engage said rack, means for normally urging said arm into engagement with said rack, a lever on said carriage for opposing said last named means, and pressure means for clamping the pipe to be tested between said test head and said carriage.

ARCHIE E. WECKERLY.